United States Patent [19]

Downing

[11] 4,203,254

[45] May 20, 1980

[54] FLAME TREATMENT APPARATUS

[75] Inventor: James D. Downing, Scott, Miss.

[73] Assignee: Delta and Pine Land Company, Scott, Miss.

[21] Appl. No.: 957,817

[22] Filed: Nov. 6, 1978

[51] Int. Cl.² .......................................... F26B 19/00
[52] U.S. Cl. ................................... 47/58; 47/DIG. 9
[58] Field of Search ................ 47/58, 5, DIG. 9, 1.42

[56] References Cited

U.S. PATENT DOCUMENTS

| | | | |
|---|---|---|---|
| 80,593 | 8/1868 | Brown | 47/58 |
| 354,109 | 12/1886 | Dudley | 47/58 |
| 2,437,397 | 3/1948 | McLemore | 47/58 |
| 4,064,636 | 12/1977 | Downing | 47/58 X |

Primary Examiner—Robert E. Bagwill
Attorney, Agent, or Firm—LeBlanc, Nolan, Shur & Nies

[57] ABSTRACT

A flame treatment apparatus for use in delinting cottonseed comprises a generally vertical stack having a horizontal toothed seed feed roller rotatably mounted across its upper end and gas burners providing a flame curtain across the stack passage through which the seeds to be cleaned drop. The stack walls are dual to provide an annular space surrounding the flame treatment passage and cooling air is passed through that space.

13 Claims, 6 Drawing Figures

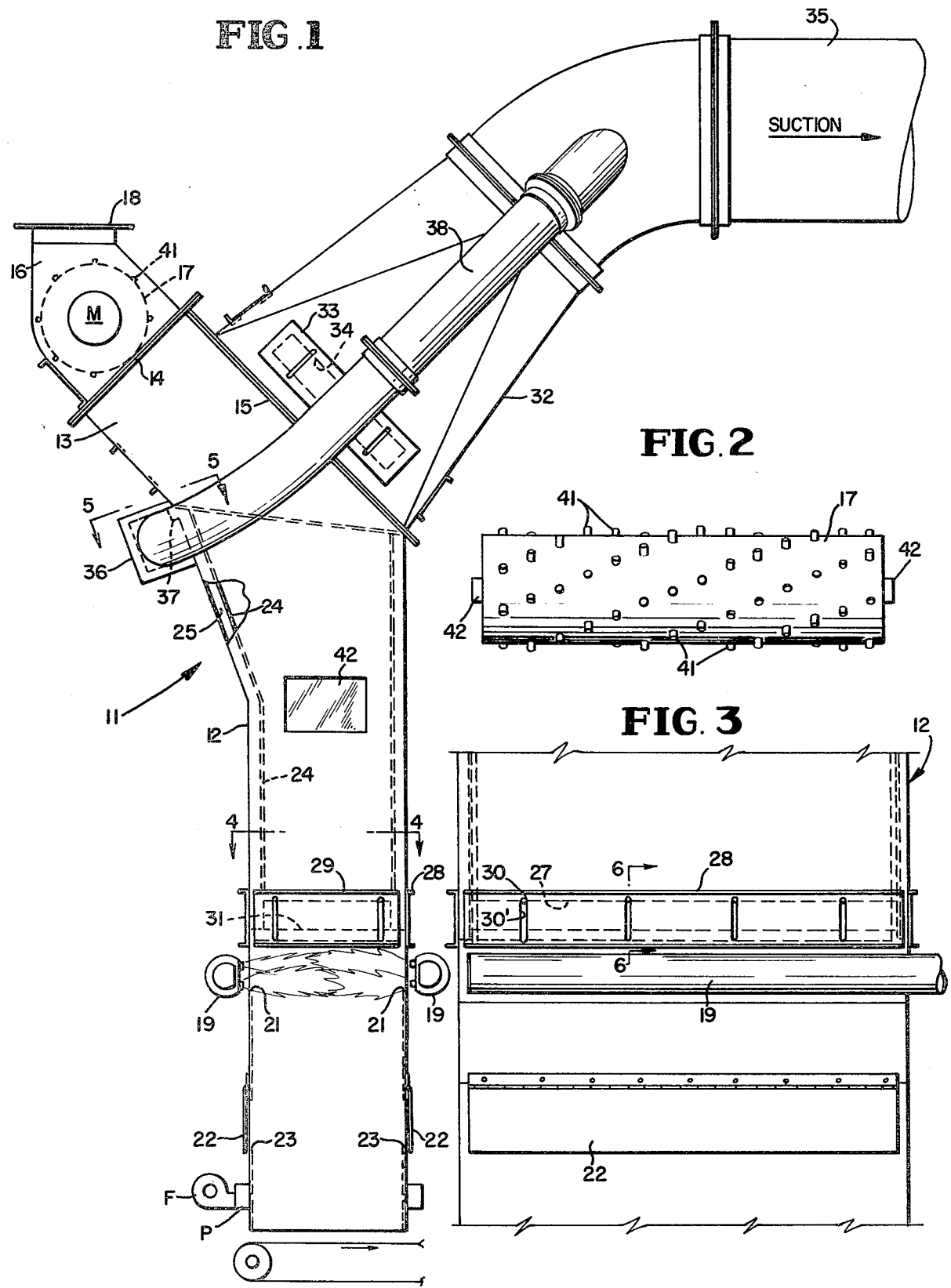

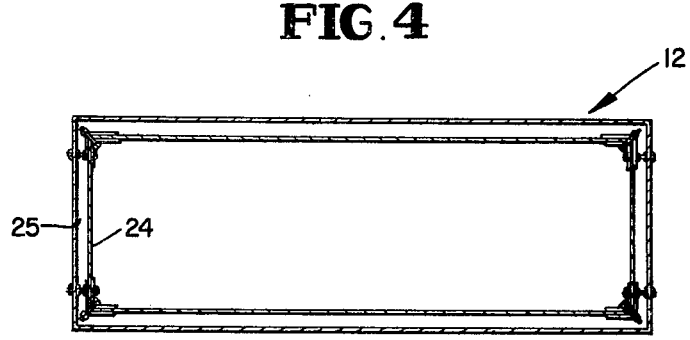
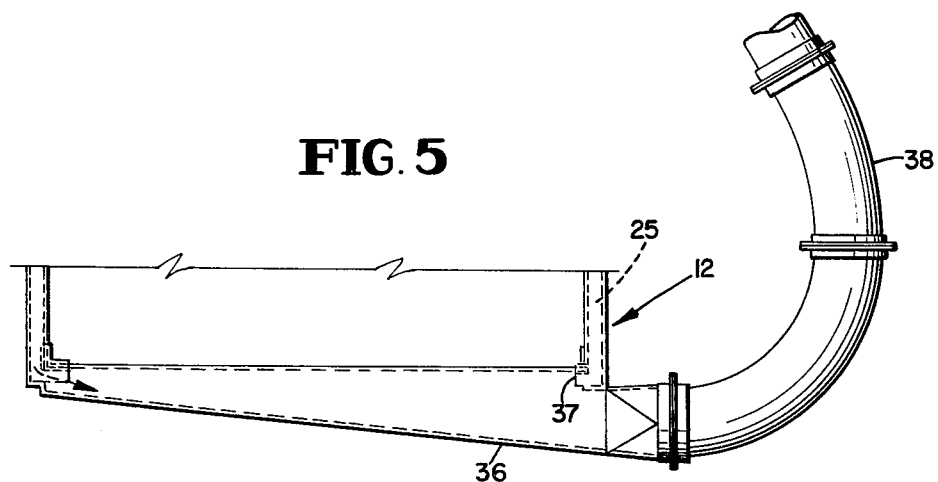
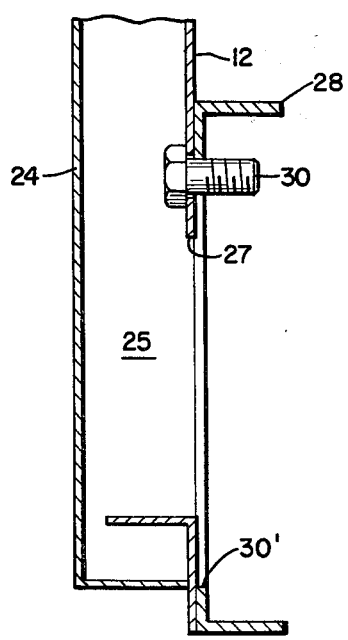

FLAME TREATMENT APPARATUS

This invention relates to apparatus for the flame treatment of cottonseed to be delinted. It may be used generally as either for precleaning the ginned seed as in any acid delinting process, or it may be used in any mechanical delinting process either before or after the mechanical delinting operation.

The flame treatment of ginned cottonseed is known and used generally, notably in association with mechanical delinting operations. The present invention provides a flame treatment apparatus that represents considerable improvements over known devices for the purpose.

The invention provides for feeding the seed in such manner as to separate the seeds from each other and from loose lint and random trash such as fragments of branches and leaves, and distributing the seed substantially uniformly, prior to passing through the flame, so as to provide for uniform singeing of all seed and complete incineration and removal of loose lint and other combustible trash. Thus the seed produced therefrom is easier to further process, regardless of the further delinting or other steps taken, and advantageously the invention provides heat that after the flame treatment may be profitably utilized as in later drying acid delinted seed.

It is therefore a major object of the invention to provide a novel flame treatment apparatus for use in cottonseed delinting wherein the seed to be delinted is controllably passed through a flame curtain.

A further object of the invention is to provide a novel flame treatment apparatus for use in cottonseed delinting wherein an introduced seed mass to be cleaned is worked to separate the seed from loose lint and other trash before falling through a passage providing a transverse flame curtain.

Another object of the invention is to provide a novel flame treatment apparatus wherein seed drops down a stack passage through a transverse flame curtain and the passage walls are cooled. Further to this object the passage has dual walls providing a surrounding space through which cooling air may be forced, by suction or by pumping.

Further objects of this invention will appear as the description proceeds in connection with the appended claims and below described drawings.

BRIEF DESCRIPTION OF DRAWINGS

FIG. 1 is an enlarged partially sectioned side view showing detail of the apparatus for flame treatment of the seed during precleaning;

FIG. 2 is an elevation showing a form of toothed roller in the entrance of the flame treatmet apparatus;

FIG. 3 is a fragmentary side elevation showing burner and air shutter locations in the flame treatment apparatus;

FIG. 4 is a section substantially on line 4—4 of FIG. 1 showing the double wall structure;

FIG. 5 is a fragmentary view at line 5—5 of FIG. 1 showing removal of cooling air from the rear side of the flame treatment stack; and FIG. 6 is a section substantially on line 6—6 of FIG. 3.

PREFERRED EMBODIMENTS

Referring to FIG. 1 the flame treatment apparatus 11 comprises a vertical stack 12 that at its upper end has secured an angularly disposed housing 13 of the same general cross section having a seed inlet opening indicated at 14 and an air and combustion product exhaust opening indicated at 15. Attached to housing 13 over opening 14 is a further housing 16 that contains a special seed feed roller 17 later described in more detail and has an inlet mouth 18.

Referring to FIG. 4, the stack 12 may be of rectangular cross section, and at least along the opposite longer sides extend gas burners 19 aligned with corresponding openings 21 in the stack side wall. Other stack cross section may be chosen as desired. The burners when ignited establish a uniform horizontal curtain of flame across the entire interior of vertical stack 12. Hinged adjustable dampers 22 are provided over corresponding openings 23 in the stack wall below the gas burners for controlling air admission into the stack.

Above the gas burners 19 the stack including its flared upper end is provided all round with an internal wall 24 providing a continuous annular space 25 all around the stack passage. Space 25 is open at its upper end to housing 13, and a bottom wall 26 closes the lower end of space 25. The outer wall of stack 12 near the lower end of space 25 is provided with at least one elongated opening 27 over which is slidably frictionally mounted an air control shutter 28, as by pins 30 and slots 30′ in the shutter. This shutter is shown closed in FIG. 3 and it may be moved upwardly to selectively uncover opening 27 to regulate air passing up space 25. Another similar slidable air control shutter 29 over stack wall opeing 31 may be provided on another side of the stack. Since space 25 is closed at its lower end above the burners no burned gases enter space 25. The function of space 25 is primarily to provide controlled cooling of the stack.

At its upper end housing 13 opens into the lower end of a hood 32 whereby suction exerted by a fan or pump (not shown) may draw ambient air up stack 12 in countercurrent relation to the descending seed mass and at the same time up through space 25, thereby continually removing products of combustion and at the same time continually cooling the stack walls and controlling the flame treatment conditions.

An adjustable air admission shutter 33 is slidably mounted over an opening 34 in the wall of hood 32 for regulating the exhaust temperature delivered to suction conduit 35.

In order to ensure that the suction exerted through hood 32 is equally and uniformly effective on the rear walls of the stack a manifold 36 (FIG. 5) is secured over a slot 37 in the stack outer wall at the upper end of space 25 and this manifold is connected by a bypass tube 38 to the suction conduit 35 adjacent to its connection to hood 32.

In some embodiments the lower end of stack 25 below the burners is laterally apertured and surrounded by a plenum P connected to a source of compressed air F which forces air up the stack during operation either in cooperation with or instead of suction applied to conduit 35.

Where the bottom end of the stack may be closed, as in some batch operations, this lower supply of pressurized air provides the upflow of air in the stack.

If desired the stack may be laterally apertured above the burners and an air supply plenum such as P connected to supply air under pressure into space 25 for cooling.

The seed mass enters housing 16 and in passing through the flame treatment apparatus first encounters the seed feed roller 17 which preferably has a plurality of spaced spiral rows of spaced spikes 41 on its periphery. Advantageously the roller, which extends effectively across and occupies the upper end area of the passage is continuously driven by a motor assembly M on housing 16 and acts to separate and distribute the individual seeds from each other and from loose linters and trash such as branches and leaves so that as the seeds fall down the stack passage through the hot gases and glame curtain there is optimum surface exposure. As the mass falls, loose fibers and trash ignite and are consumed. The fibers on the seeds ignite and are at least partially burned off before discharge. Suitable controls (not shown) are provided for regulating the burners to maintain the temperature within the stack at the optimum for proper incineration of the fibers and trash without damage to the seeds.

The housings 13 and 16 are of rectangular cross section so as to provide an effective continuation of the stack passage.

Roller 17 is preferably supported by end shafts 42 in opposite end bearings in the sides of generally rectangular housing 16 and is of such size to effectively handle the seed being introduced. In a working example the roller is about twelve inches in diameter and forty-eight inches long rotating at 200 rpm. It extends close to the side walls so as to intercept and control feed of the seeds. The spiral arrangement of the spikes has been found to be peculiarly effective, but other surface irregularities or devices may be used for effective feed control.

A dual view panel 43 of heat resistant glass is provided in the stack walls for observing action in the stack.

The foregoing flame treatment apparatus is advantageous for efficiently cleaning seed for any purpose. It ensures that the seeds are uniformly cleaned under positive temperature control and that loose free lint and other combustible trash such as leaves, branches and the like are removed, thereby increasing the ease and efficiency of any further seed processing. Moreover heat put into the device during flame treatment may be extracted and reused at another point, thereby increasing the overall efficiency and savings in most processes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In flame treatment apparatus for delinting cottonseed means providing a passage for traverse by a stream of seed to be delinted, means for controllably effecting substantial separation of incoming seed and distribution across the passage, means operatively connected to said passage for positively providing movement of air through said passage countercurrent to seed movement, and means providing a transverse curtain of flame across said passage whereby fibrous material on the seeds is ignited and at least partially burned off as the seeds travel through said passage.

2. In the apparatus defined in claim 1, said means for the separation of the seeds comprising a roller having an irregular periphery extending across the passage.

3. In the apparatus defined in claim 2, said passage being substantially vertical, said roller being rotatable about a substantially horizontal axis, and the periphery of said roller being provided with a plurality of spaced projecting teeth.

4. In the apparatus defined in claim 3, said teeth being arranged in spiral rows.

5. In the apparatus defined in claim 1, said means providing air movement comprising means applying reduced pressure to the passage and means for regulating incoming air.

6. In the apparatus defined in claim 1, said means providing the flame curtain comprising gas burner means projecting flame transversely of said passage.

7. In the apparatus defined in claim 1, a generally vertical stack wherein said flame curtain is formed and at the upper end of which is mounted housing means that contains a rotatable toothed roller for controllably introducing seeds to be cleaned and a connection to suction means for drawing air up the stack.

8. In the apparatus defined in claim 1, said passage being substantially vertical so that the seeds fall down therethrough, and said means for positively moving air through the passage comprising means for connecting the upper end of said passage to suction means, said last named means being so constructed and arranged to apply reduced pressure to the passage while not operatively affecting the fall of seeds through the passage.

9. In flame treatment apparatus for delinting cottonseed, means providing a downwardly extending passage for traverse by a stream of seed to be delinted, means for controllably effecting substantial separation of incoming seeds and distribution across the passage, means providing a transverse curtain of flame across said passage whereby fibrous material on the seeds is ignited and at least partially burned off as the seeds travel down through said passage, and means for continually cooling the walls of said passage upstream of said flame curtain.

10. In the apparatus defined in claim 9, said means for cooling the passage walls comprising a dual wall section upstream of the flame curtain providing a space around the passage, and means for continually moving cooling air through said space.

11. In the apparatus defined in claim 10, said means for continually moving air through said space comprising damper means in the outer wall of said dual wall section adjacently above said flame curtain for admitting cooling air, and cooperating means for applying reduced pressure to said space.

12. In the apparatus defined in claim 11, said passage and said space being operatively connected to the same source of reduced pressure for providing air movement therethrough.

13. In the apparatus defined in claim 12, there being a suction conduit connected to the upper end of said passage, a manifold connected to said space, and a bypass tube connected between said manifold and the suction conduit.

* * * * *